Figure 1:
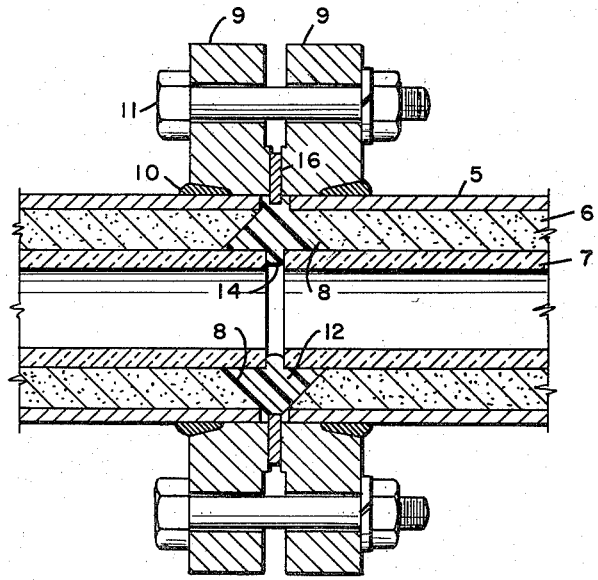

June 15, 1965 D. G. SWAN 3,189,371
JOINT FOR LINED PIPE SECTIONS WITH GASKET
COMPRESSION LIMITING MEANS
Filed Dec. 22, 1961

INVENTOR
DONALD G. SWAN
BY *Oswald H. Milmore*
HIS ATTORNEY

United States Patent Office 3,189,371
Patented June 15, 1965

3,189,371
JOINT FOR LINED PIPE SECTIONS WITH GASKET COMPRESSION LIMITING MEANS
Donald G. Swan, Pleasant Hill, Calif., assignor to Shell Oil Company, New York, N.Y., a corporation of Delaware
Filed Dec. 22, 1961, Ser. No. 161,503
3 Claims. (Cl. 285—55)

The invention relates to the art of connecting sections of pipe comprising a rigid outer part and a brittle liner, e.g., glass or ceramic, which may be pre-stressed to contain fluid at elevated pressure, although the invention is not restricted to pre-stressed liners. More particularly, the invention is concerned with a novel connection between such pipe sections, with a special gasket suitable for making such a connection, and with the pipe sections themselves insofar as they are especially shaped at the ends to permit such a connection to be made. The term "pipe" is intended to include broadly tubular conduits for the flow or containment of fluids, whether of uniform diameters or, as in the case of nozzles connected to larger vessels, have different diameters at different places along their lengths.

Gasketing of pipe sections having brittle liners has always presented problems. It is important, particularly when the pipe is to carry aggressive, viz., corrosive fluids, and/or when such fluids are under pressure, to insure a seal not only of the composite pipe but particularly at the ends of liner, to prevent such fluid from seeping at the joint to the outside of the liner, where it can come into contact with the outer structural parts of the pipe. This makes it necessary to have the gasket under compression at the point where it engages the end of the liner. Yet the degree of compression must be limited to avoid crushing the brittle liner.

It is difficult to position a simple gasket at the ends of the liners, whether the gasket be flat or circular in cross section, and some restraining means must be provided to prevent blow-out. Moreover, when the pipe is operated at elevated pressure and particularly when the liner is pre-stressed, it is important that the liner be supported from the outside all along its length, including the tip portion, whereat seepage of fluid or other causes may cause a gap—especially when the pipe contains a filler between the liner and a more durable sheath.

It is an object of the invention to provide a connection between sections of pipe lined with brittle material wherein the ends of the liner are effectively sealed and supported from the outside while the imposition of excessive stress to the liner is avoided.

A further object is to provide an improved gasket suitable for effecting such a connection.

Still another object is to provide a gasket which applies a controlled inward stress to the exposed tip portions of the liner, whereby the liner can withstand higher internal pressure.

Another object is to provide an improved lined pipe section which is adapted for making the connection, and especially a pipe section containing a pre-stressed liner, whereby the gasket can be wedged radially inwards toward the liner to insure the application of a controlled pressure from the gasket for sealing and supporting the brittle liner.

In summary, according to the invention the pipe sections contain rigid outer parts and brittle liners and have chamfers formed in the rigid parts in such a way that the chamfers become deeper (in the axial direction away from the end of the section) in the direction towards the liner, the said liner extending outwards into the chamfer so as to leave the tips thereof exposed on the outside. These sections are united after interposing a gasket which included (a) an annulus of compressible gasketing material shaped to fit into the chamfers of both pipe sections and including an upwardly projecting lip to engage the ends of the liners, and (b) spacer means such as a metal ring, carried by the outside of the gasket annulus and positioned to engage the rigid parts of the pipe sections to limit approach movement. The said lip is preferably of such thickness that it is compressed by the ends of the liner only after the gasket part within the chamfers is partially compressed.

Preferably the said rigid part of the pipe section comprises a metallic sheath and a filler between the liner and the sheath, and the said filler may act to pre-stress the liner inwardly. Also, the chamfer is preferably formed in the said filler and has the base thereof tapered, whereby the gasket is wedged radially inwards against the exposed tip of the liner as the pipe sections are drawn together.

By this construction the gasket exerts a pressure on the outside of the liner as well as against the end of the liner, thereby supporting it to withstand internal pressure and sealing it against seepage, and the relations of the pressures at these parts is controlled, and the maximum pressure is limited by the spacer ring which, further, reinforces the compressible gasket against blow-out.

Figure 2:
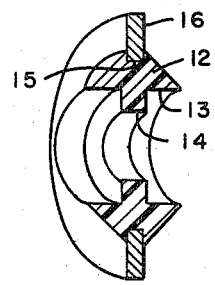

The invention will be described further with reference to the accompanying drawing forming a part of this specification and showing a preferred embodiment, wherein:

FIGURE 1 is a longitudinal section through parts of two sections of lined pipe which are connected by a gasket in accordance with the invention; and FIGURE 2 is an isometric view of the gasket, shown in section on a diametric plane.

Referring to the drawing, each pipe section comprises an outer rigid part, consisting of a metal tube or sheath 5 and a filler 6, and a liner 7 of brittle material. The sheath 5 may, for example, be steel; the filler any rigid material, such as cement, resin or lead; and the liner, glass or a ceramic. The filler is usually of a type which bonds to the liner. In a construction of special interest, but to which the invention is not restricted, the liner 7 is pre-stressed by the filler, which is in compressive stress. This may be effected by using as the filler a material which expands after being emplaced, either by setting or cooling, such as expanding cement, with or without fine sand, or by solidifying the filler, such as molten lead, while under hydrostatic pressure.

The end of each pipe has an inward chamfer 8 which is deeper in the axial direction adjacent the liner than at the radially outer part. In the embodiment shown this chamfer is formed only in the filler, but this is not restrictive of the invention; thus, when the filler is very thin or lacking the chamfer is formed in the metal sheath. Preferably the base of the chamfer is tapered, having the shape of the frustum of a cone. The end of each liner 7 is thereby peripherally exposed to the chamfer. Bolting flanges 9 are welded to the metal sheath at 10 and are drawn together by bolts 11.

The gasket comprises an annulus 12 of cohesive, elastomer which forms a gasketing material, e.g., nylon, rubber or a resin, such as polytetrafluoroethylene, sold under the trade name Teflon. In cross section the major part of the annulus is shaped to fill the chamfer. In the example shown, it is generally triangular and increases in thickness from the outer part of the pipe to a base 13 adjoining the exposed periphery of the liner. Extending radially inward from this base is a lip 14, which extends into the space between the ends of the liners. The annulus has a groove 15 at its periphery for receiving a metal spacer ring 16. The compressible annulus is snapped into the ring 16 by deformation of the former.

The dimensions of the gasket are such that the major part of the annulus fits into the chamfer and the thickness of the lip 14 is slightly less than the clearance between the ends of the liners 7 when the pipe sections are pulled together without compressing the annulus. Moreover, the radial dimension of the lip is slightly less than the wall thickness of the liner, so as not to project into the central flow channel after compression. The thickness of the spacer ring 16 is such as to limit the approach of the pipe sections to the extent described in the next paragraph.

In assembling the pipe sections the parts are assembled and the bolts 11 tightened. The major parts of the annulus, seated within the chamfers, is first compressed, thereby applying an inward pressure against the exposed portions of the liner. This is assisted by a wedging action when the chamfer is tapered, as shown. As the bolts are further tightened the ends of the liner engage the faces of the lip 14, which is compressed and deformed radially inwardly. The rigid parts of the pipe section, in this embodiment the bolting flanges 9, then engage the spacer ring 16 and limit the compressive force which can be applied to the deformable gasket.

The thickness of the spacer ring 16 should be selected to cause the pressure applied to the ends of the liner to be within the limits imposed by the structural properties of the liner material. Further, it must limit the radial inward pressure applied by the gasket against the exposed parts of the liner, which pressure should preferably match the pre-stress applied to the liner along the rest of the pipe. This control is further influenced by the wedging angle of the chamfer surface, which is shown to have the shape of the frustum of a cone with a cone angle of about 45°.

Although the gasket was shown as applied to a pipe wherein the brittle liner is pre-stressed by a thick filler material, and the gasket is effective to apply radial inward stress to the exposed tip of the liner, it is obvious that this is not restrictive of the invention; thus, the filler and sheath may be all of one piece.

I claim as my invention:
1. A gasketed joint which comprises:
  (a) a pair of pipe sections joined in spaced, coaxial, end-to-end relation, each said section comprising:
    (1) a rigid outer part having at its end a chamfer with a surface that inclines radially inwards in the direction away from the end, said rigid part extending essentially the full length of the section,
    (2) a brittle internal liner bonded to said outer part and having a terminal portion extending toward the said end opposite said chamfer and having the outer surface thereof exposed in spaced relation to the inclined surface to form therewith an annular chamber, and
    (3) abutments on said rigid parts substantially at said ends,
  (b) a gasket positioned between said sections, said gasket comprising:
    (1) an annulus of an elastomer having a radial cross section which includes:
      (a) a major area of outline to fit into and substantially fill said chambers of the conjoined sections, and
      (b) a lip area extending radially inwards from said major area, and
    (2) a metal spacer carried on the periphery of the annulus between said abutments to limit approach thereof,
  (c) the lip formed by said lip area being situated between the ends of said liner and having a thickness relative to that of the metal spacer such that upon axially contracting the section to move the abutments into engagement with the spacer, the ends of the glass liner will first engage and then compress the lip slightly, and
  (d) means for compressing said lip and parts of the annulus within said chambers and securing said abutments in clamping relation to said spacer.

2. A joint as defined in claim 1 wherein each said rigid outer part comprises an outer metallic sheath extending the full length of the respective section and an annular filler between said sheath and said brittle liner, said filler having a radial thickness greater than that of the sheath, and said chamfer being formed in said filler.

3. A joint as defined in claim 2 wherein said annular filler is in compressive stress, wherein the parts of the liner between said terminal portions are under radial compressive stress.

References Cited by the Examiner

UNITED STATES PATENTS

| | | | |
|---|---|---|---|
| 1,258,166 | 3/18 | Vollmann. | |
| 2,191,044 | 2/40 | Seligman. | |
| 2,330,966 | 10/43 | Gottwald et al. | 138—149 |
| 2,356,047 | 8/44 | Geisinger et al. | 285—55 X |
| 2,455,982 | 12/48 | Dowty. | |
| 2,464,487 | 3/49 | Chappell et al. | 138—141 X |
| 2,795,444 | 6/57 | Nenzell | 277—180 |
| 3,009,722 | 11/61 | Augustin | 277—180 |
| 3,012,585 | 12/61 | O'Brien | 138—149 |

FOREIGN PATENTS

| | | |
|---|---|---|
| 947,034 | 8/56 | Germany. |
| 836,197 | 6/60 | Great Britain. |

CARL W. TOMLIN, *Primary Examiner.*

HUNTER C. BOURNE, Jr., *Examiner.*